(12) United States Patent
Drueppel et al.

(10) Patent No.: US 11,359,784 B2
(45) Date of Patent: Jun. 14, 2022

(54) ILLUMINATION DEVICE FOR A MOTOR VEHICLE

(71) Applicant: HELLA GMBH & CO. KGAA, Lippstadt (DE)

(72) Inventors: Mathias Drueppel, Lippstadt (DE); David Duhme, Lippetal (DE); Kai Ehlert, Bueren (DE); Bernd Fischer, Altenbeken (DE); Julien Hansen, Delmenhorst (DE); Marc Kaup, Paderborn (DE); Lukas Poertner, Bielefeld (DE); Claas Tebruegge, Lippstadt (DE); Benjamin Willeke, Paderborn (DE); Jan-Henning Willrodt, Hamburg (DE)

(73) Assignee: Hella GmbH & Co. KGaA, Lippstadt (DE)

(*) Notice: Subject to any disclaimer, the term of this patent is extended or adjusted under 35 U.S.C. 154(b) by 2 days.

(21) Appl. No.: 16/847,052

(22) Filed: Apr. 13, 2020

(65) Prior Publication Data

US 2020/0240605 A1 Jul. 30, 2020

Related U.S. Application Data

(63) Continuation of application No. PCT/EP2018/076655, filed on Oct. 1, 2018.

(30) Foreign Application Priority Data

Oct. 12, 2017 (DE) .................. 10 2017 123 715.1

(51) Int. Cl.
*F21S 41/125* (2018.01)
*F21S 41/141* (2018.01)
(Continued)

(52) U.S. Cl.
CPC ........... *F21S 41/125* (2018.01); *F21S 41/141* (2018.01); *F21S 41/16* (2018.01); *F21S 41/24* (2018.01);
(Continued)

(58) Field of Classification Search
CPC .......... F21S 41/125; F21S 41/24; F21S 41/16; F21S 41/141; H04B 10/116; H04B 10/504; B60Q 1/1423; B60Q 1/143; B60Q 1/0017

See application file for complete search history.

(56) References Cited

U.S. PATENT DOCUMENTS 6,152,588 A * 11/2000 Scifres ................. B60Q 1/0011
                                                                    362/231
6,765,495 B1 * 7/2004 Dunning ................. G08G 1/161
                                                                    340/435

(Continued)

FOREIGN PATENT DOCUMENTS

DE            698 05 626 T2      9/2002
DE      10 2006 030 878 A1      3/2007
(Continued)

*Primary Examiner* — Anabel Ton
(74) *Attorney, Agent, or Firm* — Muncy, Geissler, Olds & Lowe, P.C.

(57) ABSTRACT

A lighting device for a motor vehicle, in particular a headlamp, comprising at least two, preferably three, light sources, from which light emanates during the operation of the lighting device, the light of each of the light sources differing from that of the other light sources with regard to its wavelength spectrum, comprising modulator, which bring about a modulation of the light emanating from the light sources during the operation of the lighting device, so that information is transmitted by the light, the lighting device having a mixer for mixing the light emanating from the individual light sources, so that white light emerges from the lighting device during the operation of the lighting device.

9 Claims, 1 Drawing Sheet

(51) Int. Cl.
  *H04B 10/116* (2013.01)
  *H04B 10/50* (2013.01)
  *F21S 41/24* (2018.01)
  *F21S 41/16* (2018.01)

(52) U.S. Cl.
  CPC ......... *H04B 10/116* (2013.01); *H04B 10/504* (2013.01)

(56) References Cited

U.S. PATENT DOCUMENTS

| | | |
|---|---|---|
| 7,583,901 B2 * | 9/2009 | Nakagawa ............ H05B 47/195 398/183 |
| 7,778,548 B2 | 8/2010 | Yamamoto |
| 2004/0230358 A1 * | 11/2004 | Stam ........................ B60R 1/00 701/49 |
| 2006/0056855 A1 | 3/2006 | Nakagawa et al. |
| 2013/0018558 A1 | 1/2013 | Ahn |
| 2015/0341113 A1 | 11/2015 | Krug |
| 2015/0375672 A1 | 12/2015 | Takahashi |
| 2016/0347238 A1 | 12/2016 | Hue |

FOREIGN PATENT DOCUMENTS

| | | | |
|---|---|---|---|
| DE | 102006030878 A1 * | 3/2007 | ........... H04B 10/116 |
| DE | 10 2011 055 979 A1 | 1/2013 | |
| DE | 10 2016 102 525 A1 | 8/2017 | |
| EP | 2 026 097 A1 | 2/2009 | |
| KR | 10-2011-0023577 A | 3/2011 | |

* cited by examiner

ILLUMINATION DEVICE FOR A MOTOR VEHICLE

This nonprovisional application is a continuation of International Application No. PCT/EP2018/076655, which was filed on Oct. 1, 2018, and which claims priority to German Patent Application No. 10 2017 123 715.1, which was filed in Germany on Oct. 12, 2017, and which are both herein incorporated by reference.

BACKGROUND OF THE INVENTION

Field of the Invention

The present invention relates to a lighting device for a motor vehicle, as well as a receiver device for a lighting device of this type.

Description of the Background Art

A lighting device of the aforementioned type is known from DE 10 2006 030 878 A1, which corresponds to U.S. Pat. No. 7,778,548. In the case of the lighting device described therein, a plurality of light sources is provided, which are designed, in particular, as light-emitting diodes (LEDs) of different colors. Each of the light-emitting diodes is controlled by a separate driver circuit. A data signal is divided by a multiplexer into multiple voltage signals, which are supplied to the drivers. Such a modulation of the voltage signals ensures that the light emanating from the multiple light sources produces a white light impression in the superimposition upon the object to be illuminated. The data may be extracted from the light emitted by the lighting device with the aid of a corresponding receiver device.

When using a lighting device of this type, for example as a headlamp of a motor vehicle, it has proven to be disadvantageous that an observer viewing the headlamp perceives a multi-colored light source. This is a deceptive impression, for example because red light components are not associated with a lighting apparatus disposed on the front of a motor vehicle.

SUMMARY OF THE INVENTION

It is therefore an object of the present invention to provide a lighting device, which is more suitable for use in or on a motor vehicle. In addition, a receiver device is to be specified for a lighting device of this type.

In an exemplary embodiment, it is provided that the lighting device comprises a mixer for mixing the light emanating from the individual light sources, so that white light emerges from the lighting device during the operation of the lighting device. White light is generated in this way right in or in the area of the lighting device by means of superimposition, so that an observer viewing the lighting device perceives a white light source.

It may be provided that the mixer for mixing the light emanating from the individual light sources comprise a fiber coupler, which combines the light of at least two light sources during the operation of the lighting device, at least two, preferably three, optical fibers being provided in particular, through each of which the light from the light sources reaches the fiber coupler. The outlet aperture of the fiber coupler or the outlet aperture of an optical fiber connected to the fiber coupler on the output side may be disposed within the lighting device. The light components of the light sources may be effectively mixed by the fiber coupler largely without losses, whereby little installation space is needed.

It is possible that the light sources are designed as lasers, for example, as semiconductor lasers, or as light-emitting diodes (LEDs). For example, during the operation of the lighting device, a first of the light sources may emit red light, a second of the light sources may emit green light and a third of the light sources may emit blue light. However, it is also possible to use only two light sources, which emit the light with two, in particular comparatively monochromatic, wave length spectra which are different from each other, whereby a white color impression may also result after mixing the light emanating from the two light sources.

It is possible that the modulator carries out an on-off keying or a pulse-position modulation during the operation of the lighting device. An on-off keying is the simplest means of amplitude-shift keying. A highly variable dimmability of the individual color components may be achieved with the aid of a pulse-position modulation.

It may be provided that the lighting device comprises an encoder, which encode a piece of digital information to be transmitted during the operation of the lighting device, in particular the encoder being implemented in a Manchester encoding process during the operation of the lighting device. In particular in connection with on-off keying, a Manchester encoding offers the advantage that, averaged over time, the amplitude of the voltage signals for the light sources corresponds to a fixed percentage of the maximum amplitude, for example 50% of the maximum amplitude. In this way, it may be easily ensured that the mixing of the light emanating from the light sources yields white light.

Alternatively thereto, it may be provided that the modulator and/or the encoder are designed in such a way that bit sequences of a piece of digital information to be transmitted is mapped sequentially to individual color points of an RGB space during the operation of the lighting device. A large number of consecutive bit sequences may be mapped to a large number of color points which differ from each other. On the whole, the color points may be selected in such a way that a white color impression results due to the different color points averaged over time.

It is possible that the modulator and/or the encoder are designed in such a way that they generate voltage signals during the operation of the lighting device, which are used to supply voltage to the at least three light sources. By skillfully selecting the modulation, a white color impression of the modulated, combined light may be retained, which facilitates the simultaneous illumination of the road.

A receiver device can include a sensor, which is able to separately detect the light emitted by the at least two, preferably three, light sources of the lighting device, as well as an evaluator, which is able to extract the transmitted information from the detected light, in particular by demodulation and decoding.

The present invention offers the advantage that a lighting device for a motor vehicle is easily combined with a communication device. No additional emitters for a data transmission are necessary for transmitting data between vehicles and vehicles as well as with an infrastructure. Instead, the emitters are part of the lighting device, for example of a headlamp. Because the communication may be viewed as an additional benefit to the illumination, cost savings result.

Three non-interfering channels are created by the example of the division into red, green and blue light. whereby a higher data transmission rate is made possible. Moreover, a more robust transmission may be ensured. For example, bit errors of a color channel may be detected or corrected with the aid of the other channels, using corresponding error-correcting encoding.

No bandwidth is needed in the heavily utilized radio spectrum. The transmission is generally possible only with a line of sight. Compared to radio-based communication, this results in security advantages with respect to jamming, manipulation and eavesdropping on the data signal. Because light is easily shielded, for example using a light-impermeable material, multi-user interference is a secondary problem compared to radio-based communication.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
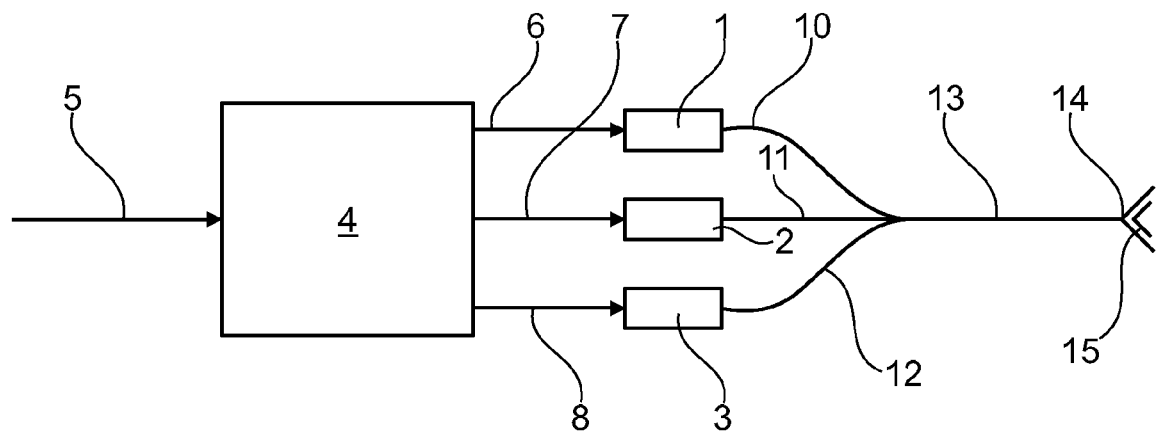
FIG. 1 shows a schematic view of a lighting device according to the invention.

The exemplary embodiment of a lighting device according to the invention illustrated in FIG. 1 may be designed, for example, as a headlamp, only parts of the headlamp being illustrated.

The lighting device comprises three light sources 1, 2, 3, which have wavelength spectra which are different from each other. For example, light source 1 may emit red-colored light, light source 2 may emit green-colored light, and light source 3 may emit blue-colored light.

Light sources 1, 2, 3 may be designed, in particular, as lasers, preferably as laser diodes. However, it is also possible that light sources 1, 2, 3 are designed as light-emitting diodes (LEDs).

The lighting device furthermore comprises a modulator and an encoder, which are combined in a component 4. The modulator and the encoder may use a data signal 5, which is output, for example, from the on-board computer of a motor vehicle, for the purpose of modulating and encoding a voltage signal 6, 7, 8 used for controlling light sources 1, 2, 3. A separate voltage signal 6, 7, 8 is generated, modulated and encoded for each of light sources 1, 2, 3.

In particular, each of voltage signals 6, 7, 8 is modulated differently than the other voltage signals 6, 7, 8. The modulation scheme and the encoding scheme are selected in such a way that the light emanating from light-emitting diodes 1, 2, 3 in its totality yields a white color impression. During the modulation of individual voltage signals 6, 7, 8, the frequency may be selected in such a way that the human eye perceives a constant intensity.

It is possible to use an on-off keying as the modulation. A Manchester encoding may be used as the encoding. In addition, codes which detect errors or correct errors may be used.

Alternatively, it is possible to map a first bit sequence of the data signal to a first color point in an RGB color space. This is done by selecting the amplitude of voltage signals 6, 7, 8 in such a way that light sources 1, 2, 3 emit corresponding light, which, in its totality, produces a color impression corresponding to this first color point in the RGB color space. Subsequent thereto, a second bit sequence is mapped to a second color point, which is different from the first one, after which a third bit sequence is mapped to a third color point, which is different from the first and second ones. A large number of consecutive bit sequences may be mapped to a large number of color points which differ from each other. On the whole, the color points may be selected in such a way that a white color impression results due to the different color points averaged over time.

The mixer for mixing the light emanating from individual light sources 1, 2, 3, the lighting device comprises a fiber coupler 9 as well as three optical fibers 10, 11, 12, which connect light sources 1, 2, 3 to fiber coupler 9. The light emanating from the three light sources, 1, 2, 3 is mixed by fiber coupler 9 so that white light results. The lighting device furthermore comprises an output-side optical fiber 13 extending from fiber coupler 9, from whose outlet aperture 14 white light 15 emanates.

The lighting device also comprises optics, which are disposed behind outlet aperture 14 and correspond, for example, to the typical functions of a headlamp. The light emanating from the lighting device may be used for lighting purposes as well as for communication between vehicles.

Figure 2:
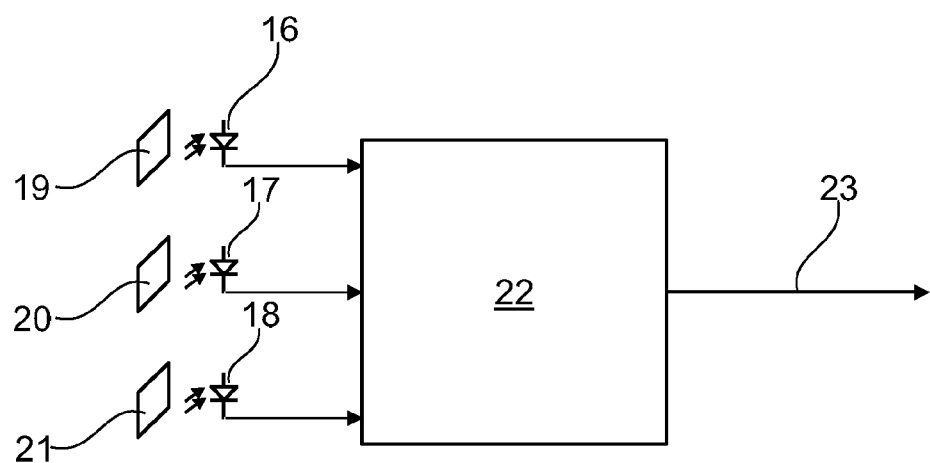
FIG. 2 shows a schematic view of a receiver device according to the invention.

The specific embodiment of a receiver device according to the invention illustrated in FIG. 2 comprises three photodiodes 16, 17, 18 used as the sensor, a color filter 19, 20, 21 being disposed in front of each one. The light is divided into the channels corresponding to the three colors by color filters 19, 20, 21. The light may be demodulated and decoded in this manner in evaluator 22 connected to photodiodes 16, 17, 18. The individual voltage signals may, if necessary, be amplified in the evaluator 22 prior to the demodulation and decoding. The demodulated and decoded signals may be combined into a data signal 23, which may be further processed.

The receiver device may be disposed, for example, in a motor vehicle, which travels in front of the motor vehicle having the lighting device according to the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a motor vehicle, the lighting device comprising:
   at least two or at least three light sources from which light emanates during an operation of the lighting device, the light of the light sources differing from each other with regard to a wavelength spectrum;
   a modulator to bring about a modulation of the light emanating from the light sources during the operation of the lighting device so that information is transmitted by the light;

a mixer to mix the light emanating from the individual light sources so that white light emerges from the lighting device during the operation of the lighting device, wherein the lighting device comprises an encoder, which encodes a piece of digital information to be transmitted during the operation of the lighting device, and wherein the encoder is implemented in a Manchester coding process during the operation of the lighting device, and wherein the modulator and the encoder are configured so that bit sequences of a piece of digital information to be transmitted are mapped sequentially to individual color points of an RGB space during the operation of the lighting device.

2. The lighting device according to claim 1, wherein the mixer for mixing the light emanating from the individual light sources comprises a fiber coupler, which combines the light of at least two light sources during the operation of the lighting device, at least two or three optical fibers being provided through each of which the light from the light sources reaches the fiber coupler.

3. The lighting device according to claim 2, wherein an outlet aperture of the fiber coupler or an outlet aperture of an output-side optical fiber connected to the fiber coupler is arranged within the lighting device.

4. The lighting device according to claim 1, wherein the light sources are lasers, semiconductor lasers, or light-emitting diodes (LEDs).

5. The lighting device according to claim 1, wherein, during the operation of the lighting device, a first light source emits red light, a second light source emits green light and a third light source emits blue light.

6. The lighting device according to claim 1, wherein the modulator carries out an on-off keying or a pulse-position modulation during the operation of the lighting device.

7. A lighting device for a motor vehicle, the lighting device comprising:
  at least two or at least three light sources from which light emanates during an operation of the lighting device, the light of the light sources differing from each other with regard to a wavelength spectrum;
  a modulator to bring about a modulation of the light emanating from the light sources during the operation of the lighting device so that information is transmitted by the light;
  a mixer to mix the light emanating from the individual light sources so that white light emerges from the lighting device during the operation of the lighting device,
  wherein the lighting device comprises an encoder, which encodes a piece of digital information to be transmitted during the operation of the lighting device, and wherein the encoder is implemented in a Manchester coding process during the operation of the lighting device, and
  wherein the modulator and the encoder are configured so that they generate voltage signals during the operation of the lighting device, which are used to supply voltage to the at least three light sources.

8. A receiver device for light of a lighting device according to claim 1, the receiver device comprising:
  a sensor that is adapted to separately detect the light emitted by the at least two or three light sources of the lighting device; and
  an evaluator that is adapted to extract the transmitted information from the detected light via demodulation and decoding.

9. The lighting device for a motor vehicle according to claim 1, wherein the lighting device is a headlamp.

* * * * *